United States Patent [19]

Blaszykowski et al.

[11] Patent Number: 5,177,735
[45] Date of Patent: Jan. 5, 1993

[54] PRIVATE TELEPHONE INSTALLATION ARCHITECTURE

[75] Inventors: Raymond Blaszykowski, Argenteuil; Robert Girard, Colombes; André Bonvallet, Asnieres, all of France

[73] Assignee: Alcatel Business Systems, Paris, France

[21] Appl. No.: 540,674

[22] Filed: Jun. 19, 1990

[30] Foreign Application Priority Data

Jun. 19, 1989 [FR] France .................. 89 08117

[51] Int. Cl.⁵ ............................. H04Q 11/04
[52] U.S. Cl. ........................ 370/58.1; 379/94
[58] Field of Search ............ 370/68.1, 62, 58.1, 370/58.2, 58.3, 60.1; 340/825; 379/94, 90, 93, 109

[56] References Cited

U.S. PATENT DOCUMENTS

| | | | |
|---|---|---|---|
| 4,061,880 | 12/1977 | Collins | 370/62 |
| 4,211,895 | 7/1980 | Davis et al. | 179/18 |
| 4,345,251 | 8/1982 | Begeman et al. | 340/825.86 |
| 4,567,589 | 1/1986 | Lecomte et al. | 370/58 |
| 4,809,260 | 2/1989 | Davidson | 370/68.1 |
| 4,839,888 | 6/1989 | Baltz et al. | 370/68.1 |
| 4,887,264 | 12/1989 | Mano et al. | 370/68.1 |

FOREIGN PATENT DOCUMENTS 2027565 2/1980 United Kingdom.
2159019 11/1985 United Kingdom.

OTHER PUBLICATIONS

U.S. patent application Ser. No. 07/299,152, Inventors: Gerard Vergnaud and Gerard Thomas: "Time Division Switching System".

Primary Examiner—Douglas W. Olms
Assistant Examiner—T. Samuel
Attorney, Agent, or Firm—Sughrue, Mion, Zinn, Macpeak & Seas

[57] ABSTRACT

The invention concerns private telephone instalations, in particular key systems or small time-division switches, each provided with a central unit (2) including a time-division digital switching network (3) controlled by a control unit (4) to enable communication of a plurality of telephone or terminals (1) either directly by means of the switching network or by means of telephone lines (32) terminating at a local central office, the telephones or terminals or lines being connected to termination circuits (30, 31) which connect them to the switching network (3) via at least one time-division multiplex link (12) and to the control unit (4). A two-wire bidirectional signalling link (13) is time-shared between all the termination circuits for interchanges of signaling with the control unit (4); it is connected direct to a series-parallel converter circuit (8).

3 Claims, 1 Drawing Sheet

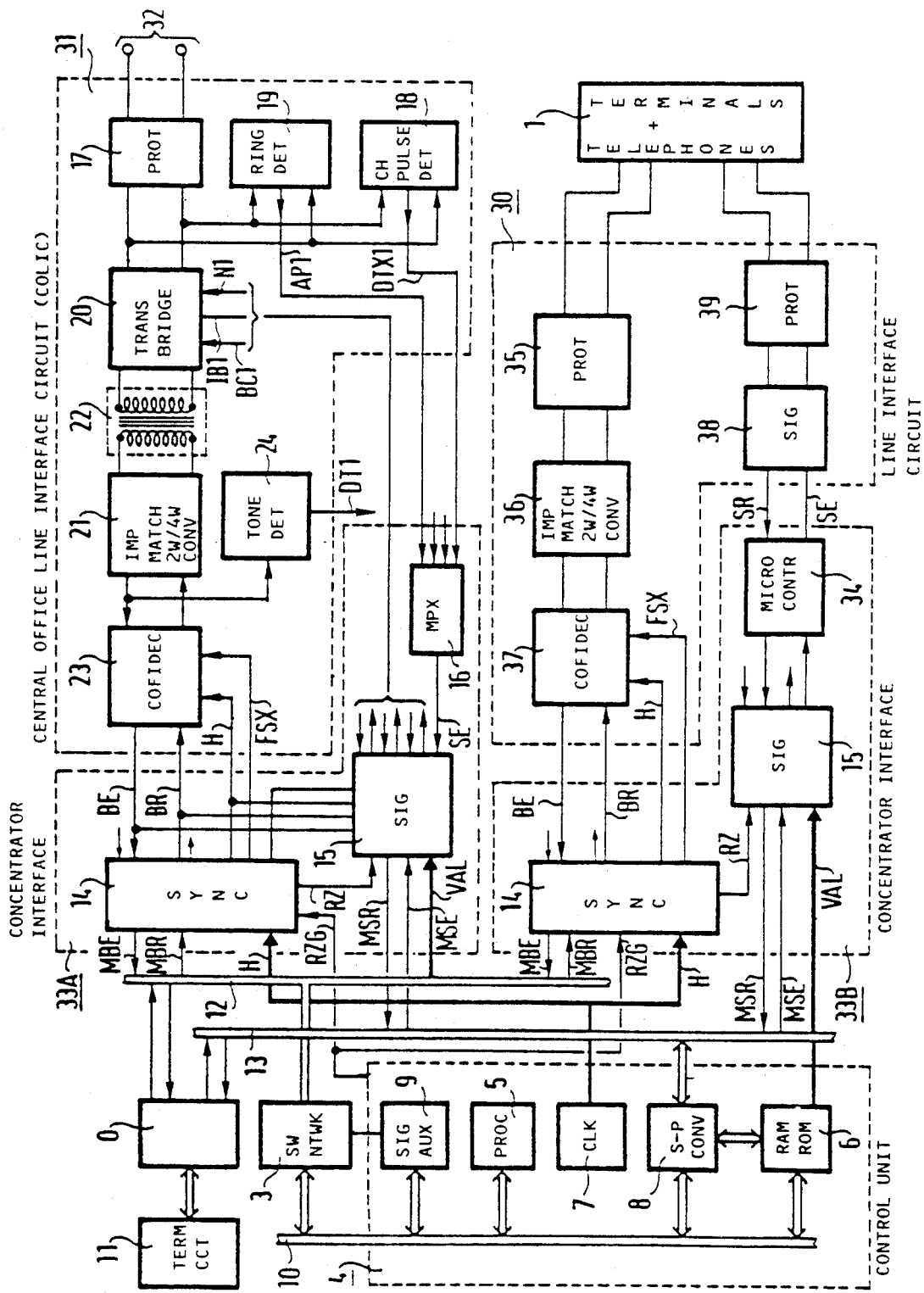

PRIVATE TELEPHONE INSTALLATION ARCHITECTURE

BACKGROUND OF THE INVENTION

The present invention concerns private telephone installations, in particular key systems and small time-division switches.

Installations of this kind serve a plurality of telephones and terminals and are conventionally connected by telephone subscriber lines to a local central office, usually forming part of a telephone network, to enable the telephones and terminals connected to the installation to communicate with telephones and terminals connected to the network but not to the installation.

Telephone installations of this kind are increasingly using time-division switching which entails encoding speech signals into digital form and which is well suited to transmission of voice or data on the same transmission media, according to changing user requirements.

Installations of this kind are managed by control units each based on at least one processor associated with a set of read-only and/or random access memories (ROM and/or RAM), the various units of the installation being connected with a specific architecture to the control unit managing them. Architectures designed for large telephone central offices are not necessarily suitable for smaller installations and are likely to lead to solutions which are expensive and which do not meet optimally the requirements of users.

SUMMARY OF THE INVENTION

The invention therefore proposes a private telephone installation architecture, in particular for key systems and small time-division switches, incorporating a central unit including a digital switching network based on at least one time-division switching matrix and controlled by a control unit conventionally based on at least one processor, a set of random access and/or read-only memories and a clock, and which is adapted to enable communication by a plurality of telephones or terminals either directly by means of the switching network that it comprises, if these telephones or terminals are connected directly to it, or by means of telephone lines which connect said installation to at least one local central office of a telephone network, the telephones, terminals or lines being connected to termination circuits of the installation by means of which they are connected to the switching network via at least one time-division multiplex link and to the control unit, characterized in that it comprises a two-wire bidirectional signalling link time-shared between all the termination circuits for interchange of signalling with the control unit to which the signalling link is directly connected at a serial-parallel converter circuit.

BRIEF DESCRIPTION OF THE DRAWINGS

The invention, its characteristics and its advantages are specified in the following description relating to the single figure described below.

The single figure shows a telephone installation architecture in accordance with the invention.

DETAILED DESCRIPTION OF THE PREFERRED EMBODIMENTS

The telephone installation shown in the single figure is designed to connect a plurality of telephones and terminals 1 through a central unit 2 to each other and optionally to other identical or compatible telephones or terminals forming part of a telephone network interconnecting such installations and to which the installation in question is connected.

The telephones may be conventional analog or digital telephones, essentially intended for speech communications, or telephones specifically designed for speech and data communications and communication with electronic data processing and other information technology equipments, or dedicated terminals such as facsimile machines or electronic telephone directory terminals.

In the embodiment described as an example the telephones or terminals 1 are of the dedicated kind and each is adapted to be connected to the installation by two pairs of wires of which one pair is used to transmit so-called conversation signals (switched data or voice signals) and the second pair is used to supply power to the telephone or terminal 1 from the central unit 2 of the installation and for the interchange of signalling between the telephones or terminals 1 and the central unit 2. As is well known, this kind of connection significantly enhances information and operating capability without requiring a totally digital installation of the integrated services private network kind.

The central unit 2 in this instance includes a digital switching network 3 based on at least one time-division switching matrix. The switching network 3 is controlled by a control unit 4 conventionally based on at least one processor 5, a set of random access and/or read-only (ROM and/or RAM) memories 6 and a clock 7. In the example shown, the control unit 4 also includes centralized auxiliaries, in particular a series-parallel converter 8 and a signalling auxiliary (generator or receiver) unit 9. A multiwire bus 10 interconnects the various units constituting the control unit 4 and controls the switching network 3 responsible for interconnecting the various telephone termination circuits of the installation connected to it by at least one bidirectional multiplex link 12 and, in this case, concentrator interfaces 33.

These termination circuits include individual line interface circuits 30 for the telephone or terminals 1, central office line interface circuits (hereinafter: OLIC) 31 for connecting the installation to a local central office (not shown) via telephone lines 32 and optionally various dedicated termination circuits 11, for example for tie lines between central offices.

The switching network 3 comprises, for example, a time-division switching matrix adapted to interconnect eight bidirectional multiplex links 12 with two wires MBE, MBR used separately for respective transmission directions and each providing 32 time slots with a data rate of 64 kbit/s carrying the voice-data signals in the form of bytes. Seven of the multiplex links 12 service the telephone terminations, that is the line interface circuits 30, the central office line interface circuits 31 and the termination circuits 11, via the corresponding concentrator interfaces 33; the remaining multiplex link services in one direction the generators and in the other direction the receivers which together constitute the signalling auxiliary unit 9.

A signalling link 13 independent of the switching network 3 handles interchange of signalling information within the installation between the control unit 4 and the termination circuits via the concentrator interfaces 33. This time-division multiplexed signalling link 13 is a two-wire link connected to the series-parallel converter 8 of the control unit 4. The converter 8 serializes information corresponding to requests (grouped requests in this instance) sent over the signalling multiplex link 13 from the control unit 4 in which this information is transmitted in parallel via the bus 10 and converts to parallel form information corresponding to responses, also grouped, received in serial form by the control unit 4 via the signalling link 13.

In one embodiment the data rate of the signalling link 13 is on the order of 2 Mbit/s and 256 time slots are available in each frame on each of the two wires MSR and MSE, one transmitting requests from the control unit 4 acting as the master unit via the converter 8 and the other the responses, the clock 7 providing the necessary timing signals. The signalling link 13 frame is in this instance the same length as the frame for time-division switching the voice-data signal samples in the switching network 3.

All signalling is grouped together in a memory of the set 6 which stores temporarily in a first half control bytes which correspond to actions at the termination circuits and in a second half monitoring bytes which correspond to status indications supplied in return by the termination circuits, this second half being in turn divided into two parts respectively reserved for monitoring relating to signalling received from termination circuits and monitoring relating to the type of these termination circuits.

In the embodiment described all termination circuits and auxiliaries connected to the signalling link 13 are processed cyclically within an overall period of 1 ms (eight frames).

A termination circuit is reserved at least one byte in a frame in each transmission direction on the signalling link 13, the bits of the two bytes concerning the same termination circuit being transmitted simultaneously in opposite directions.

In this example the termination circuits are grouped into modules according to their type and each module (comprising, for example eight line interface circuits 30 or four central office line interface circuits 31) can use successive bytes on the signalling link 13, the modules being grouped according to which multiplex link 12 transmits their voice-data signals.

As explained above, concentrator interfaces 33 connect the termination circuits to the multiplex links 12 servicing them and to the common signalling link 13. Two concentrator interfaces 33A and 33B are shown by way of example in FIG. 1, the first servicing a COLIC 31 module and the second servicing a designated telephone or terminal 1 module. Both essentially comprise a synchronization circuit 14 and a signalling circuit 15.

Each synchronization circuit 14 handles the transmission and reception of voice-data signals using the time slots reserved on one of the multiplex links 12 for all the termination circuits of the module that it serves and transmission to these termination circuits via a common link with two wires BE and BR respectively used for transmission and reception, and it further recovers or creates various timing and reset signals needed by the module which it services from the signals transmitted from the control unit 4 and in particular from the clock 7 over the link H.

The synchronization circuit will not be described in complete detail here as it is a standard circuit and its design will be obvious to those skilled in the art given that the clock signals received from the central unit are a bit clock signal for example at a frequency of 2 MHz, a frame clock signal transmitted by the link H and a reset signal transmitted by the link RZG.

Each signalling circuit 15 handles serial transmission and reception on one or other wire of the signalling link 13 of signalling data interchanged between the module that it services and the control unit 4. To this end it receives from the control unit 4 a clock signal (at 4 MHz in this example) via the link H and respective enabling signals for activating the modules that it services at times reserved for each module on the multiplex link 13 and for transmission of data characteristic of the type of module to the central unit. In this example this transmission takes place in alternate signalling frames. In this example the data is transmitted serially via the signalling link 13 and transmitted or received in parallel by the synchronization circuit 14 to or from the associated termination circuits.

The concentrator interfaces 33A and 33B are different in that they have different auxiliary arrangements related to the specific characteristics of the termination circuits that they service, in addition to their identical synchronization circuits 14 and signalling circuits 15.

The interface 33A servicing a COLIC 31 module comprises at least one multiplexer 16 adapted to receive in parallel form the monitoring information usually transmitted by dedicated and individual links in the form of current or voltage binary signals from the COLICs in order to retransmit them serially on the signalling link 13, and at least one buffer register (not shown) for transmission of control data to the termination circuits of the module.

In this example the interface 33B services a dedicated telephone or terminal 1 line interface circuit 30 module and includes a microcontroller 34 which handles the transfer of control and monitoring binary data between the signalling circuit 15 and the line interface circuits 30 of the module, it being understood that the signalling circuit is adapted to supply or to receive this data in parallel form and that the line interface circuits are adapted to transmit or receive this data in the form of serial messages transmitted on a single wire in each direction per line interface circuit; in the example being described each message transmitted includes a start bit and an end bit between which the data is placed, together with a parity check bit.

Consequently, it is the microcontroller 34 which handles the various operations needed for such transmissions. The line interface circuits 30 and the COLICs 31 serviced are designed to be connected in the former case to the two pairs of wires of a dedicated telephone or terminal 1 and in the latter case to the two wires of a telephone line 32 connected to a local central office (not shown).

The wires A, B of a telephone line are conventionally connected to a protection circuit 17 of the COLIC at which they terminate, this device providing protection against any overvoltages that may be applied to the line accidentally.

This device comprises, for example, two equal-value capacitors in series between the wires A, B on the input side of two inductive circuits, one on each of the two wires and each comprising one of the two windings of a transformer and a resistor shunting that winding, the device being conventionally completed by a surge arrestor diode connected between the wires on the output side of the inductive circuits. The capacitors and the inductive circuits protect the COLIC from radio frequency interference and the diode and the capacitors protect the COLIC and the circuits on its output side against any overvoltages transmitted by the line. A charging pulse detector 18, a ringing detector 19 and a transmission bridge 20 are connected in parallel to the two wires A, B of the telephone line 32 via the protection device 17 in each COLIC 31.

Binary signals AP and DTX respectively characterizing detection of ringing and charging pulses are separately provided in the form of current or voltage levels by the detectors 18 and 19 to the multiplexer 16 of the corresponding concentrator interface 33A via individual links such as the links AP1 and DTX1 for the COLIC 31 of rank 1. They are transmitted to the signalling circuit 15 in the form of a series of bits time-division multiplexed by the multiplexer 16.

The tone detector 24 is designed to sense dial tone signals transmitted as sinusoidal signals in the frequency band between 300 and 500 Hz. It is usually based on one or more filters and connects to the output of the converter-matching circuit 21 of the COLIC 31 which incorporates it, on the transmit wire to the cofidec circuit 23 of the circuit 21. It will not be described in any more detail as it can be one of the conventional circuits well known to those skilled in the art.

The charging pulse detector 18 is designed to sense charging pulses transmitted on the telephone line 32 from the local central office at which the line terminates. It detects very low frequency (12 or 16 kHz, for example) charging pulses conventionally transmitted in differential mode by the local central office on the two wires A, B of the line 2 or charging pulse signals transmitted at extremely low frequency (50 Hz for example) and in common mode on the same line wires by the local central office. It can be based on one or more filters in one of the usual arrangements that will not be described here as they are familiar to those skilled in the art and are not directly related to the invention.

The transmission bridge 20 essentially comprises a polarity detector adapted to signal to the signalling circuit 15, by means of a binary signal IB sent on the IB1 line, reversals of the polarity of the battery voltage applied to the telephone line 32 by the local central office at which the line terminates. It also includes a line loopback and loop disconnect dialling detector which supplies a signal BC on the link BC1 and a line current regulator circuit, these circuits not being shown in FIG. 1. It is connected to the wires of the telephone line 2 through the protection device 17, the transmission bridge 20 and a transformer 22 in series.

The circuit 21 itself provides the link between the transformer 22 and, on the one hand, a cofidec circuit 23 connected to the synchronization circuit 14 which serves the COLIC 31 of which it forms part and, on the other hand, a tone detector 24 of the COLIC 31. The circuit 21 is based on operational amplifiers with one amplifier in the transmit channel to the cofidec circuit 23 and another in the receive channel for analog signals produced by the cofidec circuit 23. A balancing network conventionally implemented with resistors and capacitors matches the COLIC to the various lines to which it may be connected. The transformer 22 conventionally isolates the circuits connected to one of its two windings from those connected to the other and also provides bidirectional transmission of alternating current signals (in particular those in the telephone band).

The circuit 23 is a conventional coder-filter-decoder which converts into the form of analog signals that can be transmitted on a telephone line such as the line 32 voice-data digital signals supplied in the form of bytes by the associated synchronization circuit 14 via the time-division multiplex link formed by the wire BE, in turn connected to the wire MBE of the multiplex link 12, and also converts into digital signals analog signals supplied over the telephone line 32 for their successive transmission on the wires BR and MBR. For this purpose the circuit 23 receives the clock signals via the link H and a channel time slot select signal FSX via an individual link, for example the link FSX1 for the circuit 1, to enable it to effect the transmissions in which it is involved. In the present example this circuit is, for example, a NATIONAL SEMICONDUCTORS TP 3057 with serial input and output.

One of the two pairs of wires from a dedicated telephone or terminal 1 is connected to an arrangement including a cofidec circuit 37 in series with an impedance matching and two-wire/four-wire converter circuit 36 and a protection device 35. In this example the cofidec circuit 37 is of the same type as the cofidec circuit 23 of a COLIC, and the same goes for the matching/converter circuit 36. On the other hand, the protection device has only to pass alternating current signals, the telephone or the terminal not being powered by this pair of wires. It therefore comprises a capacitor for transmitting alternating current voice-data signals on each of the two wires which connect it to the matching converter circuit 36, these capacitors blocking any DC component accidentally emanating from the telephone or terminal.

The second pair of wires from a telephone or terminal 1 terminates at a signalling arrangement 38 via a protection device 39 analogous to the device 17 of a COLIC. It provides at least partial remote power feed to the telephone or terminal 1 and transmits signalling messages (asynchronous serial symmetrical digital signals) between the telephone or terminal and the signalling arrangement 38 of the line interface circuit 30 to which it is connected.

Signalling messages are interchanged by superimposing them on the remote power feed to the telephone or terminal in half-duplex asynchronous mode. In the direction from the microcontroller 34 to the telephone or terminal the latter receives an interrogation or control message from the control unit 4 and responds with a monitoring message indicating, for example, that the telephone is idle or that one of its keys (not shown) has been pressed.

The signalling arrangement 38 includes a modulator and a demodulator (not shown). The modulator comprises, for example, two transistors configured as a current generator driving said second pair of wires, its input being driven by the signal placed by the microcontroller 34 on the wire SE.

The demodulator is based on a comparator receiving at its inputs the falling pulses transmitted by whichever of the two wires of the second pair is at the positive supply voltage and the rising pulses transmitted by the other wire of the second pair, which is at the negative supply voltage. A hysteresis threshold detector made up of three resistors and two capacitors in series between the wires of said second pair transmits these pulses to the inputs of the comparator, each of which inputs is connected to one end of the center resistor of the detector and to one of the wires via one of the capacitors and a different resistor of the detector. The comparator generates a digital signal on the wire SR connecting it to the microcontroller which services it.

according to the hysteresis signal resulting from the pulses applied to its inputs.

The microcontroller 34 is an HITACHI HMS412C, for example, comprising a processor unit associated with working RAM and a mask-programmed memory for its operating software, a timer supplying a real time clock signal, for example every 156 μs, the clock of the microcontroller operating at the speed of the 2 MHz clock. Two transmitter/receiver circuits are used in this example to service four line interface equipments, for example.

Bidirectional dialogue at a transmitter-receiver circuit is effected in this example by load sharing in four phases. During a first phase the transmitter sends a control message on the second pair of a first telephone or terminal line while the associated receiver receives a signalling message via the second pair of a fourth telephone or terminal line.

During a second phase the transmitter sends a control message on the second pair of a second telephone or terminal line while the associated receiver receives a signalling message via the second pair of the first line.

During a third phase the transmitter sends a control message on the second pair of the third telephone or terminal line while the associated receiver receives a signalling message via the second pair of the second line.

During a fourth phase the transmitter sends a control message on the second pair of the fourth telephone or terminal line while the associated receiver receives a signalling message via the second pair of the third line.

The microcontroller 34 is also connected to the synchronization circuit 15 which services it by write and read control links ECR and LEC, by a bidirectional data link which transmits the data in parallel, byte by byte, and by a clock link HE and a reset link RZ, both the latter originating at the signalling circuit 15.

The types of termination circuit that a concentrator interface 33 processes is in this example indicated cyclically to the control unit 4 by the signalling circuit 15 of the interface which to this end has type identification inputs to be specifically hardwired, as is usual in this art.

We claim:

1. A private telephone installation architecture incorporating a central unit (2), said central unit including a digital time-division switching network (3), controlled by a control unit (4) and carrying signals arranged in frames, said control unit having at least one processor (5), a set (6) of random access and/or read-only memories and a clock (7), said telephone installation permitting communication by a plurality of telephones or terminals (1) by means of said switching network either directly, or indirectly through telephone lines (32) which connect said installation to at least one local central office of a telephone network, the telephones, terminals or lines in the installation being connected to said switching network by interface circuits (30, 31), via at least one bi-directional time-division multiplex link (12) carrying said signals arranged in frames, wherein said installation also includes a specific two-wire signalling link (13) connected to all said interface circuits and connected via a serial-parallel converter to said control unit, the frames for this signalling link having time slots fixedly assigned to the interface circuits.

2. A private telephone installation architecture according to claim 1 characterized in that the interface circuits (30, 31) are grouped into modules and by type and are connected to the signalling link, and to the multiplex link (12) which services them, through a concentrator (33) optionally common to a plurality of same type interface circuit modules, each concentrator comprising a synchronization circuit (14) handling the transmission and reception of voice-data signals in the time slots reserved on one of the multiplex links (12) for all interface circuits of the module it services, said synchronization circuit being connected to the interface circuits in the module it services via a common two-wire link (BE, BR) with one wire used for transmission and the other for reception and being connected to a signalling circuit (15) which handles serial transmission and reception on the signalling link (13) of signalling data interchanged between the module which it services and the control unit (4) and the transmission of this signalling data between itself and the interface circuits that it services.

3. A private telephone installation architecture according to claim 2 characterized in that it comprises a dedicated concentrator (33B) for dedicated telephones or terminals (1) connected to by pairs of wires to a telephone type interface circuit (30) which services it, said dedicated concentrator (33B) including a signalling circuit (15) and a microprocessor (34) and said telephone type interface circuit (30) including a signalling circuit (38), a link between the signalling circuit (15) in said dedicated concentrator and the signalling circuit (38) incorporated in said telephone type interface circuit being provided by said microcontroller (34) handling conversion of signalling data interchanged in parllel in the form of bytes with the signalling circuit (15) in said dedicated coincentrator into signals exchanged in the form of serial messages with the signalling circuit (38) of the telephone type interface circuit (30).

* * * * *